(12) United States Patent
Volk

(10) Patent No.: US 7,181,631 B2
(45) Date of Patent: Feb. 20, 2007

(54) MECHANISM TO CONTROL AN ON DIE VOLTAGE REGULATOR

(75) Inventor: Andrew M. Volk, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 459 days.

(21) Appl. No.: 10/396,542

(22) Filed: Mar. 25, 2003

(65) Prior Publication Data

US 2004/0193927 A1    Sep. 30, 2004

(51) Int. Cl.
*G06F 1/26* (2006.01)
*G06F 1/32* (2006.01)

(52) U.S. Cl. .................... 713/300; 713/320
(58) Field of Classification Search ............. 713/300, 713/320
See application file for complete search history.

(56) References Cited

U.S. PATENT DOCUMENTS

| | | | | |
|---|---|---|---|---|
| 5,336,986 A | * | 8/1994 | Allman | 323/268 |
| 5,552,696 A | * | 9/1996 | Trainor et al. | 323/275 |
| 5,712,589 A | * | 1/1998 | Afek et al. | 327/538 |
| 5,919,262 A | * | 7/1999 | Kikinis et al. | 713/300 |
| 6,005,819 A | * | 12/1999 | Shin | 365/226 |
| 6,189,107 B1 | * | 2/2001 | Kim et al. | 713/300 |
| 6,232,753 B1 | * | 5/2001 | Pasotti et al. | 323/267 |
| 6,347,379 B1 | * | 2/2002 | Dai et al. | 713/320 |
| 6,438,462 B1 | * | 8/2002 | Hanf et al. | 700/297 |

OTHER PUBLICATIONS

Colin Holland, "Co-processing platform for re-configurable computing", Jul. 7, 2002, Embedded.com.*

\* cited by examiner

*Primary Examiner*—Thomas Lee
*Assistant Examiner*—Ji H. Bae
(74) *Attorney, Agent, or Firm*—Blakely, Sokoloff, Taylor & Zafman LLP

(57) ABSTRACT

According to one embodiment, a voltage regulator system is disclosed. The system includes a load, a voltage regulator circuit coupled to the load, and control logic coupled to the voltage regulator circuit. The control logic controls the voltage regulator circuit so that the voltage regulator circuit supplies power to the load if activated by the control logic and a core voltage power supply supplies power to the load if the voltage regulator circuit is de-activated by the control logic.

19 Claims, 3 Drawing Sheets

| VRM_EN | PWROK | SLPS | RegEN | Core_BYP# |
|--------|-------|------|-------|-----------|
| 0 | X | X | 0 | 1 |
| 1 | 0 | X | 1 | 1 |
| 1 | 1 | 0 | 0 | 0 |
| 1 | 1 | 1 | 1 | 1 |

| SLPS | SLPS_DLY | Core_BYP# |
|------|----------|-----------|
| 0 | 0 | 0 |
| 1 | 0 | 0 |
| 1 | 1 | 1 |
| 0 | 1 | 0 |

MECHANISM TO CONTROL AN ON DIE VOLTAGE REGULATOR

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention relates to computer systems; more particularly, the present invention relates to delivering power to a power sensitive system such as a computer system.

BACKGROUND

Integrated circuit components are typically powered by voltage regulators located at a remote location. Particularly, the voltage regulator is mounted on a computer system motherboard. Having the voltage regulator at a remote location requires the power signal to travel to the die by means of a motherboard trace and a bond-wire on the package, which are both highly inductive. The inductance typically blocks high frequencies.

Often, the integrated circuit includes components that operate at various frequencies (e.g., the 400–500 MHz switching range). Consequently, a voltage drop exists across the inductive path because of the load switching current. The voltage drop is represented by the formula $V=L*(di/dt)$. This voltage drop restricts the voltage regulation. One way to overcome this is to include de-coupling capacitors. The de-coupling capacitors compensate for the inductance by storing and immediately supplying energy. De-coupling capacitors on the motherboard can help compensate for board inductance. De-coupling capacitors can be placed on the integrated circuit die to help compensate for package and die inductance. However, capacitors increase the die area of the integrated circuit. Moreover, the leakage current draw of the capacitors may affect low power applications.

BRIEF DESCRIPTION OF THE DRAWINGS

The invention is illustrated by way of example and not limitation in the figures of the accompanying drawings, in which like references indicate similar elements, and in which.

DETAILED DESCRIPTION

Logic to control a voltage regulator integrated in an integrated circuit is described. In the following detailed description of the present invention, numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
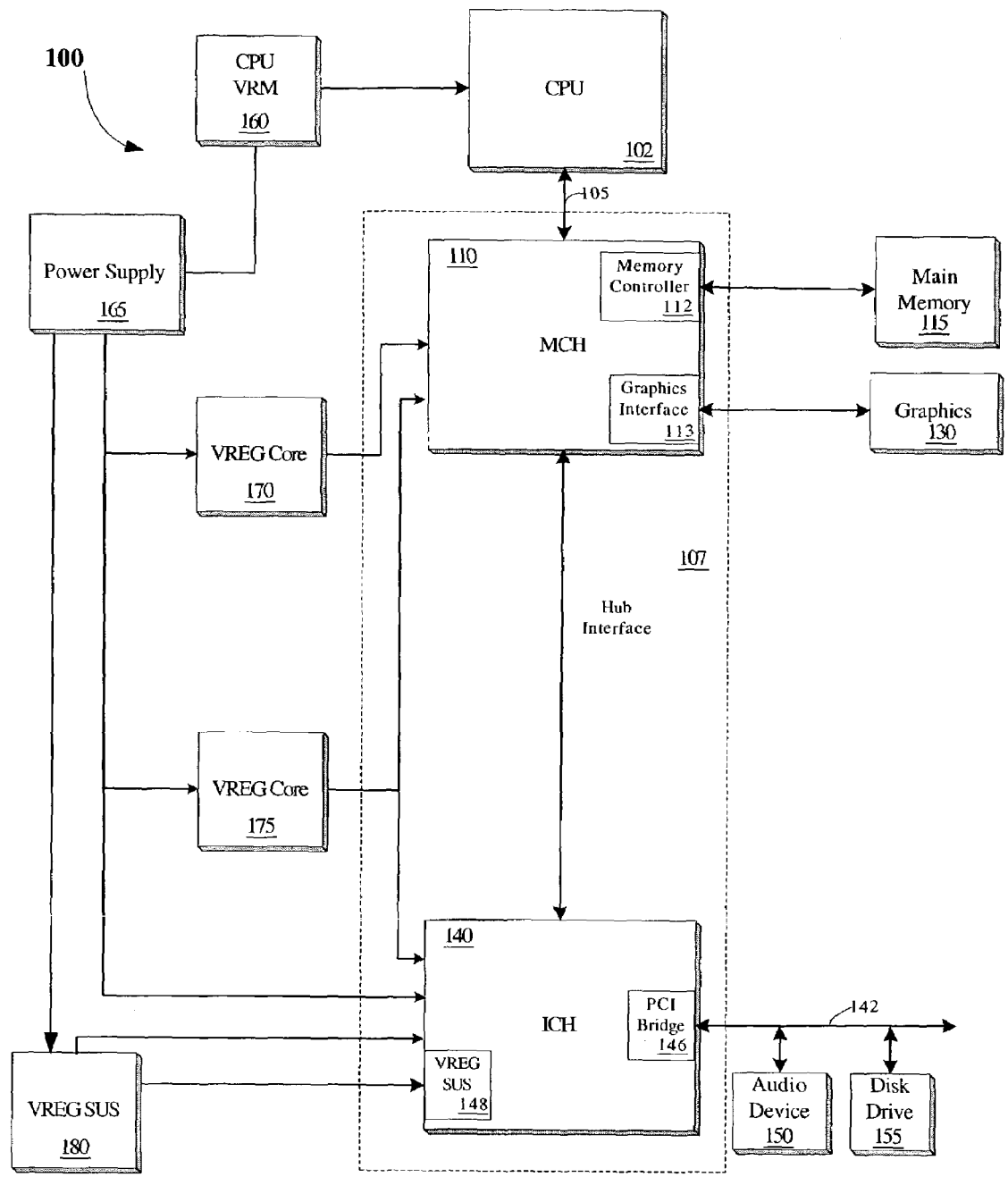
FIG. 1 is a block diagram of one embodiment of a computer system.

FIG. 1 is a block diagram of one embodiment of a computer system 100. Computer system 100 includes a central processing unit (CPU) 102 coupled to bus 105. In one embodiment, CPU 102 is a processor in the Pentium® family of processors including the Pentium® II processor family, Pentium® III processors, and Pentium® IV processors available from Intel Corporation of Santa Clara, Calif. Alternatively, other CPUs may be used.

A chipset 107 is also coupled to bus 105. Chipset 107 includes a memory control hub (MCH) 110. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to bus 105, such as multiple CPUs and/or multiple system memories.

MCH 110 may also include a graphics interface 113 coupled to a graphics accelerator 130. In one embodiment, graphics interface 113 is coupled to graphics accelerator 130 via an accelerated graphics port (AGP) that operates according to an AGP Specification Revision 2.0 interface developed by Intel Corporation of Santa Clara, Calif.

In addition, the hub interface couples MCH 110 to an input/output control hub (ICH) 140 via a hub interface. ICH 140 provides an interface to input/output (I/O) devices within computer system 100. ICH 140 may be coupled to a Peripheral Component Interconnect bus adhering to a Specification Revision 2.1 bus developed by the PCI Special Interest Group of Portland, Oreg. Thus, ICH 140 includes a PCI bridge 146 that provides an interface to a PCI bus 142. PCI bridge 146 provides a data path between CPU 102 and peripheral devices.

PCI bus 142 includes an audio device 150 and a disk drive 155. However, one of ordinary skill in the art will appreciate that other devices may be coupled to PCI bus 142. In addition, one of ordinary skill in the art will recognize that CPU 102 and MCH 110 could be combined to form a single chip. Further graphics accelerator 130 may be included within MCH 110 in other embodiments.

In addition, computer system 100 includes a power supply 165 and a multitude of voltage regulators that are used to provide power to various components within computer system 100. CPU voltage regulator module (VREG) 160 provides voltage to CPU 102. VREG core 170 supplies memory voltage for MCH 110 and memory 115. VREG core 175 supplies core voltage for chipset 107. In one embodiment, VREG core 170 supplies a 2.5V supply voltage and 175 supplies a 1.5V supply voltage.

In a further embodiment, voltage regulators 160, 170 and 175 supply voltage during normal (full power) operation and are off during suspend mode operation. Additionally, VREG core 170 may have an alternate mode to supply standby power to main memory 115 during certain suspend modes.

VREG SUS 180 differs from the other voltage regulators in FIG. 1 in that it is designed to be powered in all normal and suspend power management modes. In desktop computer systems 100, VREG SUS 180 supplies power whenever the main power supply 165 is getting AC power. In mobile computer systems 100, VREG SUS 180 supplies power when the PC is in normal and suspend power states and is off when the entire PC is completely shut down. In a further embodiment, VREG SUS 180 supplies a 3.3V supply voltage.

According to one embodiment, a VREG suspend module 148 is integrated on the chipset 107 integrated circuit within ICH 140. In a further embodiment, VREG core 175 provides power to ICH 140 during a core power (fully on) mode, while VREG suspend module 148, along with VREG SUS module 180, provides power to ICH 140 during the suspend mode. In yet a further embodiment, VREG suspend module 148 provides a 1.5V scaled down from a 3.3V received from VREG 180.

Figures 2, 3:
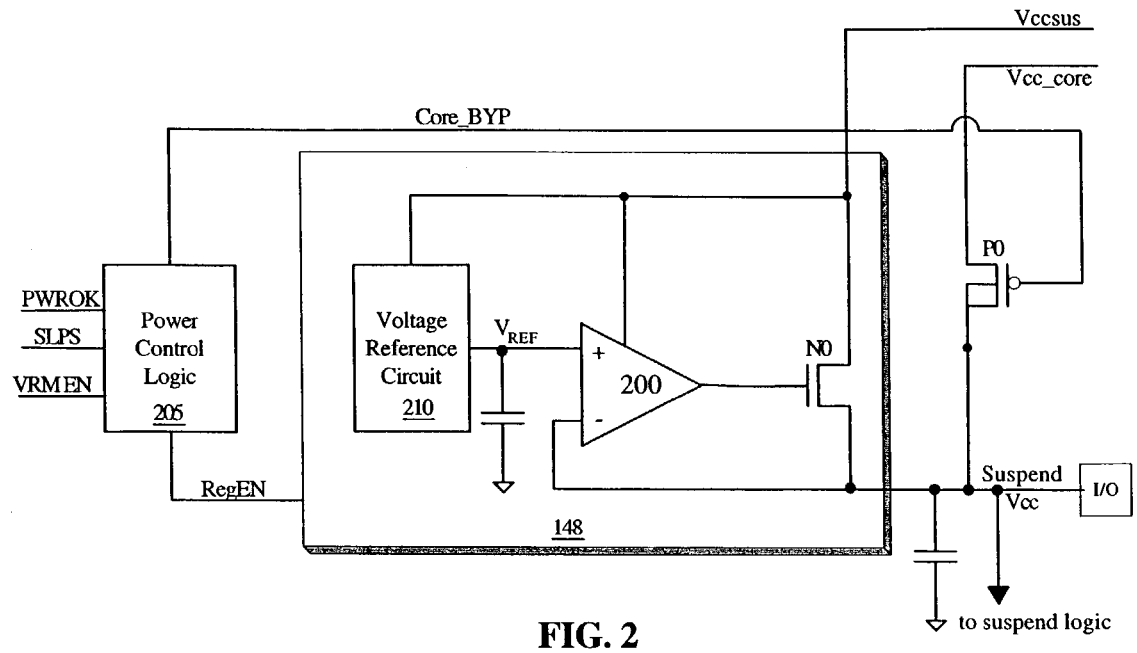
FIG. 2 is a block diagram of one embodiment of power control logic coupled to a voltage regulator module.
FIG. 3 is a logic table for power control logic.

FIG. 2 is a block diagram of one embodiment of VREG suspend module 148 mounted within ICH 140. In one embodiment, VREG suspend module 148 is coupled to power control logic 205. Power control logic 205 enables or disables VREG suspend module 148 depending on the state of control logic 205. According to one embodiment, control logic receives PWROK, SPLS, and VRM_EN signals that determine the status of RegEN and Core_BYP outputs transmitted from control logic 205.

The SPLS signal indicates whether computer system 100 is operating in a sleep (suspend) state (e.g., S3, S4 or S5 states, as defined in the Advanced Configuration and Power Interface specification, Rev. 2.0b). In one embodiment, the SLPS signal is active whenever computer system 100 is operating in a sleep state. The VRM_EN signal indicates whether power is to be provided to suspend logic (not shown) from VREG suspend module 148 or an external board voltage.

According to one embodiment, power is supplied to the suspend logic whenever the VRM_EN signal is active. However, whenever the VRM_EN signal is inactive, power is supplied to the suspend logic via the input/output (I/O) pad. The PWROK signal indicates the state of the core power supplies. When it is active (high), the core power supplies are up and have been stable for 100 ms. System clocks are also stable. If system power is removed, PWROK should go inactive before the core supply leaves its specified range.

The RegEN output signal is transmitted to suspend module 148. In one embodiment, the RegEN signal activates suspend module 148 when active (e.g., high logic level). The Core_BYP output signal is coupled to PMOS transistor P0. In one embodiment, when the Core_BYP signal is active (e.g., low logic level), transistor P0 is activated and power is supplied to the suspend logic from the core power plane (e.g., Vcc_core).

However, when the Core_BYP signal is inactive (e.g., high logic level), transistor P0 is shut off and power is supplied to the suspend logic from VREG suspend module 148. In a further embodiment, the RegEN and Core_BYP signals are not simultaneously active. Thus, one or the other will be active to provide power to the suspend logic, unless the VRM_EN signal is inactive.

VREG suspend module 148 is an on-die voltage regulator that supplies power to the suspend logic when enabled by power control logic 205. VREG suspend module 148 includes operational amplifier 200, a voltage reference circuit 210 and transistor N0.

Voltage reference circuit 210 generates a reference voltage ($V_{REF}$) off of the suspend 3.3 volt supply received from VREG SUS 180. According to one embodiment, voltage reference circuit 210 is implemented using a resistor divider to generate a 1.5V $V_{REF}$. However, in other embodiments other types of accurate voltage reference circuit (such as a bandgap voltage reference generator) may be used.

In one embodiment, $V_{REF}$ may be adjusted after manufacturing the die (post-silicon) by changing the tap point of voltage reference circuit 210. In a further embodiment, the adjustment is made in software upon receiving configuration bits from a Basic Input Output System (BIOS) during startup of computer system 100. In another embodiment, the adjustment is made by a metal change.

Operational amplifier 200 combined with the transistor N0 is the main portion of the voltage regulator. In one embodiment, the transistor N0 is implemented using NMOS transistor. However, a PMOS transistor design is also possible. $V_{REF}$ determines the DC output voltage, Suspend Vcc, coupled to the suspend logic. When a current increase occurs, Suspend Vcc is pulled lower, below $V_{REF}$.

Operational amplifier 200 compensates by driving a larger gate voltage on N0, if the current increase is within the bandwidth of the regulator. Otherwise, the decoupling capacitors respond first to the current spike, which use their stored energy to help hold up the output voltage Suspend Vcc. The larger gate voltage recovers the output voltage Suspend Vcc, which is a closed loop system. According to one embodiment, VREG suspend module 148 also provides the output voltage Suspend Vcc to the I/O pad at ICH 140. A decoupling capacitor can be attached to the I/O pad to add stored charge.

FIG. 3 illustrates one embodiment of a logic table for power control logic 205. As discussed above, PWROK, SPLS, and VRM_EN signals that determine the status of RegEN and Core_BYP outputs transmitted from control logic 205. Thus, the top table shows the PWROK, SPLS, and VRM_EN input combinations for the RegEN and Core_BYP outputs.

The lower table illustrates another embodiment for the standard power management. In such an embodiment, power control logic 205 generates a delayed version of the SLPS signal (e.g., SLPS_DLY). The SLPS_DLY signal extends the amount of time that the core power Vcc_core is coupled to the suspend logic. The delay provides time for VREG suspend module 148 to stabilize and provide power before the core power is disconnected, to prevent the suspend voltage from sagging.

Figure 4:
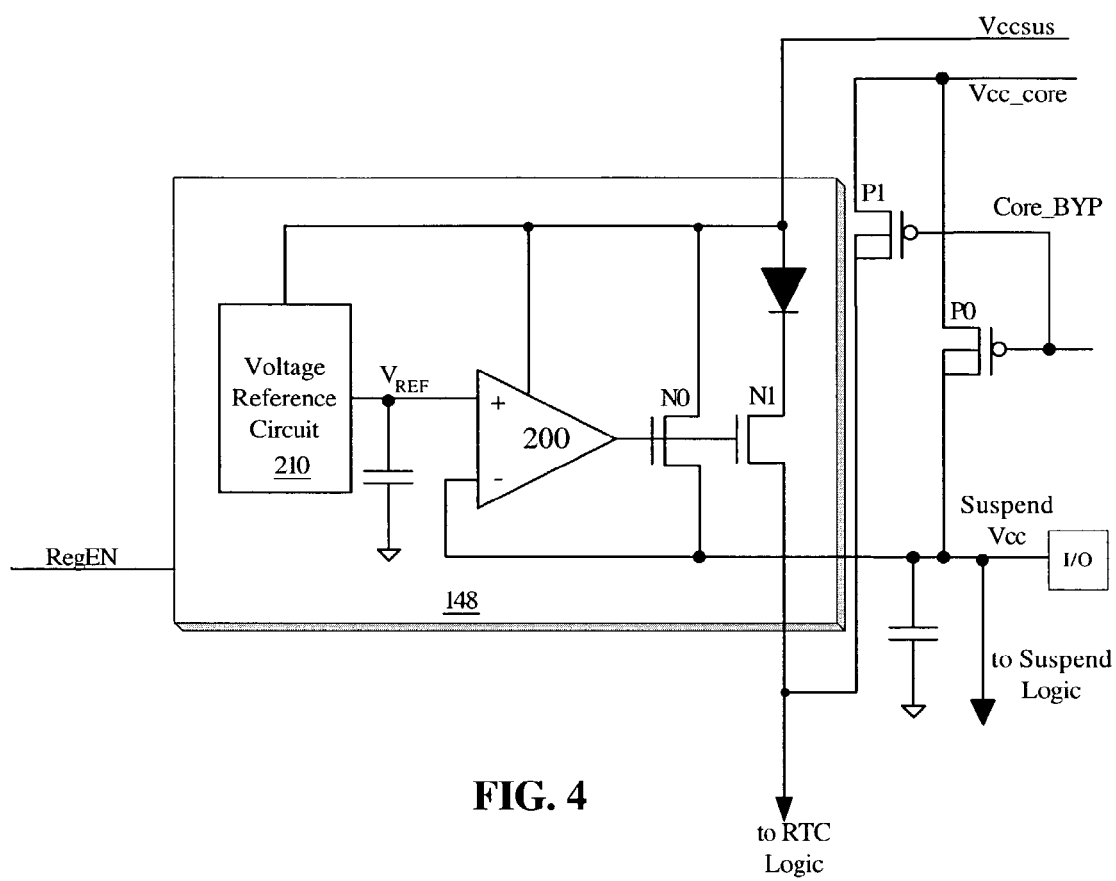
FIG. 4 is a block diagram of another embodiment of power control logic coupled to a voltage regulator module.

FIG. 4 is a block diagram of another embodiment of VREG suspend module 148 mounted within ICH 140. In this embodiment, a second NMOS transistor N1 and a second PMOS transistor P1 are included within VREG suspend module 148 to supply power to RTC logic, as well as the suspend logic. PMOS transistor P1 provides power to the RTC logic when Core_BYP is active. NMOS transistor N1 provides power to the RTC logic when Core_BYP is inactive and Reg_EN is active. In the latter case, if the current densities of NMOS transistors N0 and N1 are close, the voltage on the suspend logic and the RTC logic will also be close. Consequently, level shifters are not required to transfer logic signals between suspend logic and the RTC logic.

According to one embodiment, the device size of transistor N1 can be small given the low current draw in the RTC logic. A diode (or a diode connected resistor) is also provided in the drain of transistor N1 to prevent current flow back through transistor N1, and to prevent current from being drawn from the RTC logic.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A system comprising:
a load;
a voltage regulator circuit, coupled to the load; and
control logic, coupled to the voltage regulator circuit, to receive external power and sleep state control signals and to control the voltage regulator circuit based upon values received for the power and sleep state control signals indicated in a logic table, wherein the voltage regulator circuit supplies power to the load if activated by the control logic and a core voltage power supply supplies power to the load if the voltage regulator circuit is de-activated by the control logic.

2. The system of claim 1 wherein the control logic transmits an enable signal to the voltage regulator circuit to activate and de-activate the voltage regulator circuit.

3. The system of claim 2 further comprising a first transistor coupled to the load and the core voltage power supply.

4. The system of claim 3 further wherein the control logic transmits a bypass signal to the gate of the first transistor to activate the first transistor to supply power to the load via the core voltage power supply.

5. The system of claim 1 wherein the voltage regulator comprises:
an amplifier to provide a regulated output voltage; and
a voltage reference circuit, coupled to the amplifier, to provide a reference voltage to the amplifier.

6. The system of claim 5 wherein the voltage reference circuit is a bandgap.

7. The system of claim 5 wherein the voltage reference circuit is a resistor divider.

8. The system of claim 5 wherein the voltage regulator further comprises a transistor coupled to the output of the amplifier.

9. A computer system comprising:
a central processing unit (CPU); and
a chipset, coupled to the CPU, including:
a voltage regulator; and
control logic, coupled to the voltage regulator circuit, to receive external power and sleep state control signals and to control the voltage regulator circuit based upon values received for the power and sleep state control signals indicated in a logic table, wherein the voltage regulator circuit supplies power to a load if activated by the control logic and a core voltage power supply supplies power to the load if the voltage regulator circuit is de-activated by the control logic.

10. The computer system of claim 9 wherein the control logic transmits an enable signal to the voltage regulator circuit to activate and de-activate the voltage regulator circuit.

11. The computer system of claim 10 further comprising a first transistor coupled to the load and the core voltage power supply.

12. The computer system of claim 11 further wherein the control logic transmits a bypass signal to the gate of the first transistor to activate the first transistor to supply power to the load via the core voltage power supply.

13. The computer system of claim 9 wherein the voltage regulator comprises:
an amplifier to provide a regulated output voltage; and
a voltage reference circuit, coupled to the amplifier, to provide a reference voltage to the amplifier.

14. A system comprising:
a first load;
a second load;
a voltage regulator circuit, coupled to the first and second loads; and
bypass logic, coupled to the first load and the second load, to receive external power and sleep state control signals and to control the voltage regulator circuit based upon values received for the power and sleep state control signals indicated in a logic table, wherein the voltage regulator circuit supplies power to the first and second loads if the voltage regulator circuit is activated, and the bypass logic supplies power from a core voltage power supply to the first and second loads if the voltage regulator circuit is de-activated.

15. The system of claim 14 wherein the bypass logic comprises:
a first transistor coupled to the first load to supply power from the core voltage power supply to the first load; and
a second transistor coupled to the second load to supply power from the core voltage power supply to the second load.

16. The computer system of claim 15 wherein the first and second transistors are PMOS transistors.

17. The system of claim 14 wherein the voltage regulator comprises:
an amplifier to provide a regulated output voltage; and
a voltage reference circuit, coupled to the amplifier, to provide a reference voltage to the amplifier.

18. The system of claim 17 wherein the voltage regulator further comprises:
a first transistor having a gate coupled to the amplifier, a drain coupled to a suspend power supply and a source coupled to the first load; and
a second transistor having a gate coupled to the amplifier, a drain coupled to a suspend power supply and a source coupled to the second load.

19. The system of claim 18 wherein the voltage regulator comprises:
a diode coupled to the drain of the first transistor.

* * * * *